United States Patent
Ide et al.

(10) Patent No.: US 7,319,776 B2
(45) Date of Patent: Jan. 15, 2008

(54) IMAGE PROCESSING METHOD AND IMAGE PROCESSING PROGRAM

(75) Inventors: Katsumi Ide, Kawasaki (JP); Hideo Kamata, Kawasaki (JP); Yasunao Izaki, Kawasaki (JP); Shunji Sakane, Kawasaki (JP); Satoshi Kataoka, Kawasaki (JP); Kazumasa Komatsu, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 10/101,269

(22) Filed: Mar. 20, 2002

(65) Prior Publication Data

US 2003/0099378 A1    May 29, 2003

(30) Foreign Application Priority Data

Nov. 26, 2001    (JP)    ............................. 2001-359344

(51) Int. Cl.
     *G06K 9/00*      (2006.01)
     *G06K 9/36*      (2006.01)
     *H04N 7/18*      (2006.01)
     *H04N 9/47*      (2006.01)

(52) U.S. Cl. ...................... 382/103; 382/107; 382/154; 382/236; 382/284; 382/318; 348/143

(58) Field of Classification Search ................ 382/103, 382/107, 236, 284, 122, 145–152, 154, 285, 382/318; 348/143–160, 207.1–208.99; 358/447

See application file for complete search history.

(56) References Cited

U.S. PATENT DOCUMENTS 5,067,015 A  *   11/1991   Combridge et al. ... 375/240.11
5,402,171 A  *   3/1995   Tagami et al. ........... 348/219.1
5,477,272 A  *   12/1995   Zhang et al. .............. 348/699
5,649,032 A  *   7/1997   Burt et al. ................. 382/284
5,838,828 A  *   11/1998   Mizuki et al. ............. 382/236
6,313,452 B1*   11/2001   Paragano et al. ........ 250/201.3

(Continued)

FOREIGN PATENT DOCUMENTS

JP      10-294900      11/1998

(Continued)

OTHER PUBLICATIONS

Nakagawa et al.; "An Input Method of Document Image in Dynamic Environment"; Scientific information statement. Information System Academic Society Study Report, vol. 98, No. 59; Jul. 17, 1998.

Primary Examiner—Bhavesh M Mehta
Assistant Examiner—Manav Seth
(74) Attorney, Agent, or Firm—Staas & Halsey LLP

(57) ABSTRACT

An overall image obtained by successively imaging different imaging regions a plurality of times during an image period using an imaging device is separated into a plurality of partial images respectively corresponding to each of the plurality of imaging operations. In cases where the object of imaging consists only of a static object, all of the partial images show more or less the same data. However, in cases where the object of imaging includes a moving object in addition to a static object, differences are generated in the partial images, which have different imaging timing. Accordingly, a judgement as to whether or not a moving object is contained in the overall image produced by synthesizing the plurality of partial images can be made by comparing the partial images.

21 Claims, 9 Drawing Sheets

U.S. PATENT DOCUMENTS

| | | | |
|---|---|---|---|
| 6,335,985 B1 * | 1/2002 | Sambonsugi et al. | 382/190 |
| 6,463,174 B1 * | 10/2002 | Lim et al. | 382/173 |
| 6,487,304 B1 * | 11/2002 | Szeliski | 382/107 |
| 6,628,805 B1 * | 9/2003 | Hansen et al. | 382/107 |
| 6,658,136 B1 * | 12/2003 | Brumitt | 382/103 |
| 6,665,342 B1 * | 12/2003 | Brown et al. | 375/240.16 |
| 6,687,386 B1 * | 2/2004 | Ito et al. | 382/103 |

FOREIGN PATENT DOCUMENTS

| | | |
|---|---|---|
| JP | 2000-308045 | 11/2000 |
| JP | 2001-078176 | 3/2001 |

* cited by examiner

FIG. 2

(a) OVERALL IMAGE

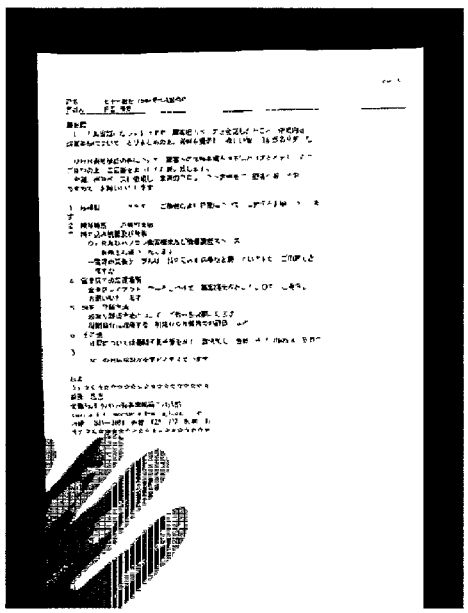

(b) OVERALL IMAGE

①②③ ①②③ ①②③ ①②③ ①②③ ①②③
④⑤⑥ ④⑤⑥ ④⑤⑥ ④⑤⑥ ④⑤⑥ ④⑤⑥
⑦⑧⑨ ⑦⑧⑨ ⑦⑧⑨ ⑦⑧⑨ ⑦⑧⑨ ⑦⑧⑨

①②③ ①②③ ①②③ ①②③ ①②③ ①②③
④⑤⑥ ④⑤⑥ ④⑤⑥ ④⑤⑥ ④⑤⑥ ④⑤⑥
⑦⑧⑨ ⑦⑧⑨ ⑦⑧⑨ ⑦⑧⑨ ⑦⑧⑨ ⑦⑧⑨

(c) PARTIAL IMAGE

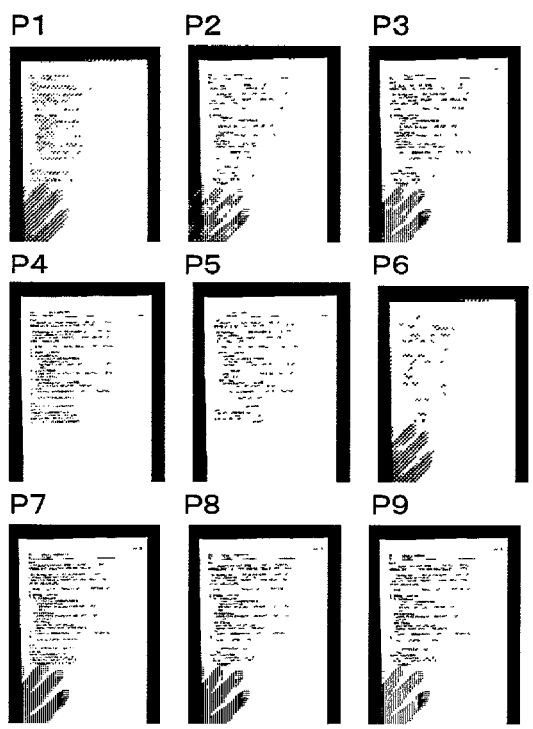

(d) PARTIAL IMAGE

PARTIAL IMAGE P1
①①①①①①①①①①①①①
①①①①①①①①①①①①①
①①①①①①①①①①①①①
①①①①①①①①①①①①①

PARTIAL IMAGE P2
②②②②②②②②②②②②②
②②②②②②②②②②②②②
②②②②②②②②②②②②②
②②②②②②②②②②②②②

.
.
.

PARTIAL IMAGE P9
⑨⑨⑨⑨⑨⑨⑨⑨⑨⑨⑨⑨⑨
⑨⑨⑨⑨⑨⑨⑨⑨⑨⑨⑨⑨⑨
⑨⑨⑨⑨⑨⑨⑨⑨⑨⑨⑨⑨⑨
⑨⑨⑨⑨⑨⑨⑨⑨⑨⑨⑨⑨⑨

FIG. 3
(a) PARTIAL IMAGE IN WHICH ONLY STATIC OBJECT IS PRESENT
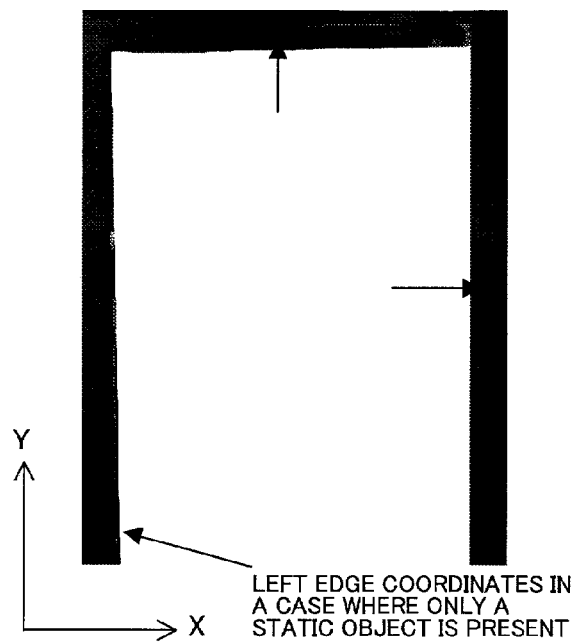
LEFT EDGE COORDINATES IN A CASE WHERE ONLY A STATIC OBJECT IS PRESENT
(b) PARTIAL IMAGE IN WHICH MOVING OBJECT IS IMAGED
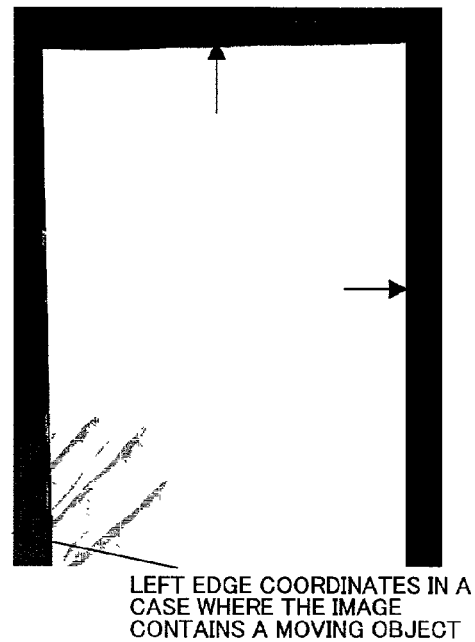
LEFT EDGE COORDINATES IN A CASE WHERE THE IMAGE CONTAINS A MOVING OBJECT FIG. 5
(a) PARTIAL IMAGE IN WHICH ONLY STATIC OBJECT IS PRESENT
(b) PARTIAL IMAGE IN WHICH MOVING OBJECT IS IMAGED
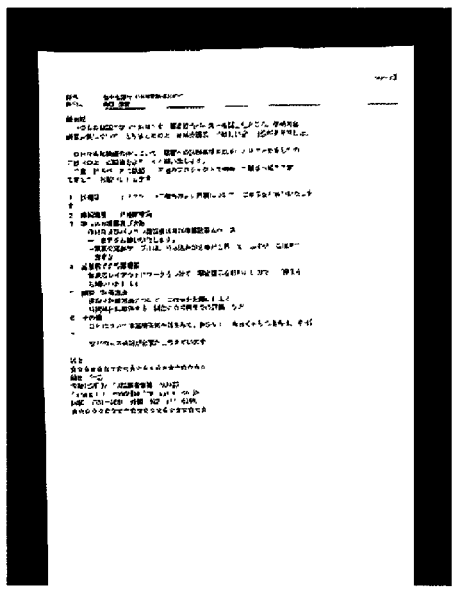
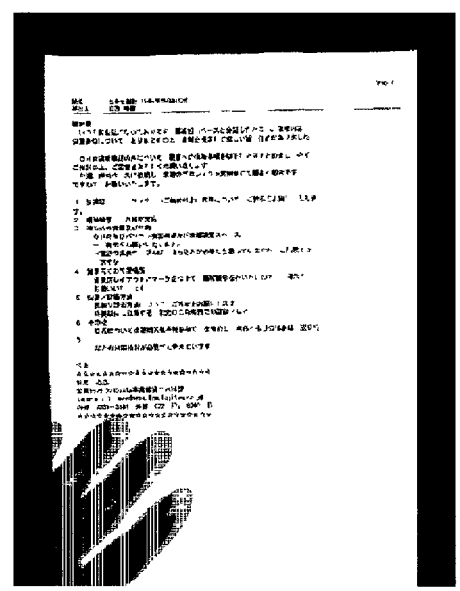
(b) HISTOGRAM
(d) HISTOGRAM
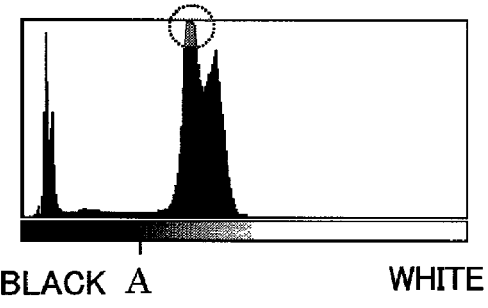
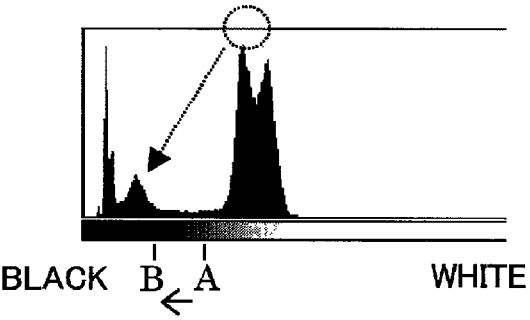

FIG. 7
(a) PARTIAL IMAGE OF STATIC OBJECT ONLY
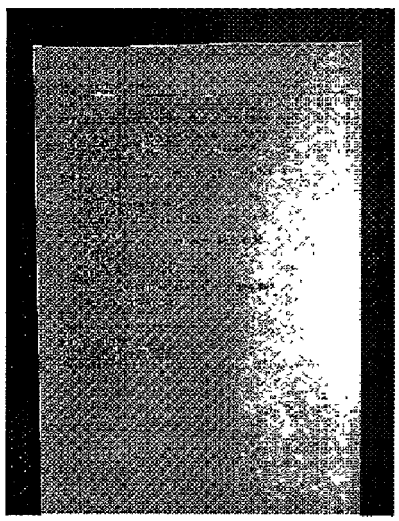
(b) PARTIAL IMAGE CONTAINING MOVING OBJECT
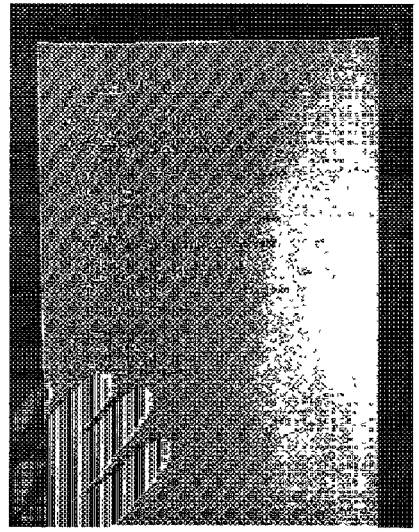
EXOR CALCULATION
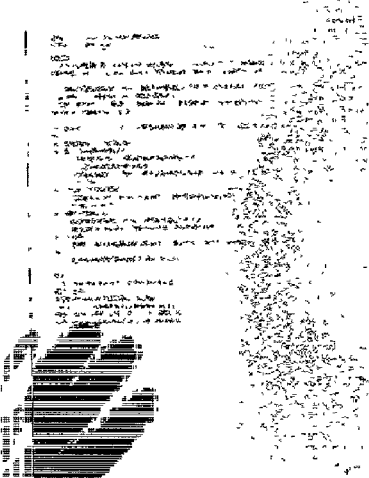
(c) IMAGE EXPRESSING DEGREE OF DIFFERENCE BETWEEN THE TWO PARTIAL IMAGES

- IMAGING ELEMENT 10
- MOVING BODY 16
- DOCUMENT SUCH AS ACCOUNT BOOK, SALES SLIP OR THE LIKE 14
- CARRYING STAND 12

(a)

①○○ ①○○ ①○○ ①○○ ①○○ ①○○
○○○ ○○○ ○○○ ○○○ ○○○ ○○○
○○○ ○○○ ○○○ ○○○ ○○○ ○○○

①○○ ①○○ ①○○ ①○○ ①○○ ①○○
○○○ ○○○ ○○○ ○○○ ○○○ ○○○
○○○ ○○○ ○○○ ○○○ ○○○ ○○○

(b)

①②③ ①②③ ①②③ ①②③ ①②③ ①②③
④⑤⑥ ④⑤⑥ ④⑤⑥ ④⑤⑥ ④⑤⑥ ④⑤⑥
⑦⑧⑨ ⑦⑧⑨ ⑦⑧⑨ ⑦⑧⑨ ⑦⑧⑨ ⑦⑧⑨

①②③ ①②③ ①②③ ①②③ ①②③ ①②③
④⑤⑥ ④⑤⑥ ④⑤⑥ ④⑤⑥ ④⑤⑥ ④⑤⑥
⑦⑧⑨ ⑦⑧⑨ ⑦⑧⑨ ⑦⑧⑨ ⑦⑧⑨ ⑦⑧⑨

IMAGE PROCESSING METHOD AND IMAGE PROCESSING PROGRAM

BACKGROUND OF THE INVENTION

1. Field of the Invention

The present invention relates to an image processing method and image processing program for images acquired by means of an imaging device, and more particularly relates to an image processing method and image processing program for judging whether or not a moving object is contained in an image. The image processing program of the present invention is applied to an image processing device that successively images different imaging regions a plurality of times during an imaging period; this program detects the presence or absence of imaging of a moving object during the imaging period.

2. Description of the Related Art

FIG. 9 is a schematic perspective view of an account book/sales slip reading device as an example of an imaging device. In this account book/sales slip reading device, a document 14 such as an account book, sales slip or the like that is placed on a carrying stand 12 is imaged by means of an imaging element 10 utilizing a CCD (charge-coupled device) or the like, and the image thus acquired is subjected to character recognition utilizing OCR (optical character reader) processing by a computer device, so that the imaged account book, sales slip or the like is read.

Accordingly, since high-resolution imaging is required, imaging is performed with the CCD shifted a plurality of times (using a so-called "pixel shift method") in the case of an account book/sales slip reading device which has a relatively small-capacity CCD, so that a high resolution comparable to that of an image obtained by means of a large-capacity CCD is obtained.

FIGS. 10A and 10B are diagrams that illustrate this pixel shift method. For example, in the case of a CCD with 500,000 pixels, only an image equivalent to 500,000 pixels can be obtained by a single imaging; however, by driving the CCD upward and downward and to the left and right by the pixel shift method so that imaging is performed with the imaging region divided into nine imaging operations, an image equivalent to 4,500,000 pixels can be obtained.

The parts indicated by ① in FIG. 10A are the parts imaged in a single imaging (equivalent to 500,000 pixels); in order to create an image of 4,500,000 pixels, imaging is performed with spaces (parts indicated by O) left. Then, after the parts indicated by ① have been imaged one time, an image of 4,500,000 pixels (500,000 pixels×9) can be obtained by driving the CCD so that the parts indicated by ② through ⑨ are successively imaged as shown in FIG. 10B, and combining these images into a whole. Furthermore, the number of times that imaging is performed is not limited to nine times; it is sufficient if imaging is performed the number of times that produces the required resolution, such as two times, four times or the like.

OCR processing can be utilized by obtained a high-resolution image by imaging utilizing the abovementioned pixel shift method. However, if moving objects other than documents such as account books, sales slips or the like (which are static objects) are contained in the image, there may be cases in which normal character recognition cannot be performed from the image. In the case of an account book/sales slip reading device, for example, there may be cases in which imaging is erroneously performed after the account book, sales slip or the like has been placed on the carrying stand 12 by the user but before the user's hand (see FIG. 9) has been removed from the carrying stand 12, so that the user's hand is superimposed on this account book, sales slip or the like during imaging. If a moving object such as the user's hand (see number 16 in FIG. 9) is thus contained in the image, erroneous recognition or erroneous operation occurs in the OCR processing. Especially in the case of an account book/sales slip reading device using the pixel shift method, imaging is performed a plurality of times; as a result, the imaging period is relatively long, and the probability of a moving object being present in the imaging region during the imaging period is relatively high.

Thus, in order to perform OCR processing, it is necessary that only documents such as account books or sales slips (static objects) be contained in the image. In cases where a moving object is erroneously contained in the image, it is desirable that OCR processing not be performed, and that processing that urges the user to perform imaging again be performed.

SUMMARY OF THE INVENTION

Accordingly, it is an object of the present invention to provide an image processing method and image processing program that are used to judge whether or not a moving object is contained in an image acquired by means of an imaging device.

The image processing method of the present invention that is used to achieve the abovementioned object is an image processing method for images acquired by successively imaging different imaging regions by means of an imaging device a plurality of times during an imaging period, this image processing method comprising a separating step in which the abovementioned image is separated into a plurality of partial images respectively corresponding to each of the plurality of imaging operations, and a judgement step in which a judgement is made as to whether or not a moving object has been imaged during the imaging period on the basis of a comparison of the abovementioned plurality of partial images.

In the judgement step, for example, (1) processing which detects the object-of-imaging parts respectively contained in the plurality of partial images is used to detect at least one edge position of each of these object-of-imaging parts, and the plurality of partial images are compared utilizing these edge positions. Alternatively, in the judgement step, (2) the optical density gradation distribution of the plurality of partial images is determined, and the plurality of partial images are compared utilizing this optical density gradation distribution. As another alternative, in the judgement step, (3) the degree of difference between two partial images among the plurality of partial images is determined for a plurality of combinations of two partial images, and the partial images are compared utilizing these degrees of difference.

In cases where the objects of imaging consist exclusively of static objects, all of the partial images will show more or less the same data. However, in cases where the objects of imaging include moving objects in addition to static objects, differences will be generated in partial images that have a different imaging timing. Accordingly, by comparing the partial images, it is possible to make a judgement as to whether or not a moving object is contained in the overall image formed by synthesizing the plurality of partial images.

Furthermore, the static objects are (for example) documents such as account books, sales slips or the like; however, the present invention is not limited to such static objects. Moreover, the moving object is (for example) the user's hand; similarly, however, the present invention is not limited to such a moving object.

Furthermore, an image processing program which is used to perform the abovementioned image processing method in a computer is also provided. Moreover, an image processing device which performs the abovementioned image processing method is also provided.

BRIEF DESCRIPTION OF THE DRAWINGS

FIGS. 2A, 2B, 2C and 2D are diagrams illustrating the image processing method in an embodiment of the present invention;

FIGS. 3A and 3B are diagrams illustrating a first image processing method in an embodiment of the present invention;

FIGS. 5A, 5B, 5C and 5D are diagrams illustrating a second image processing method in an embodiment of the present invention;

FIGS. 7A, 7B and 7C are diagrams illustrating a third image processing method in an embodiment of the present invention;

DESCRIPTION OF THE PREFERRED EMBODIMENTS

Embodiments of the present invention will be described below. However, the technical scope of the present invention is not limited to these embodiments.

Figure 1:
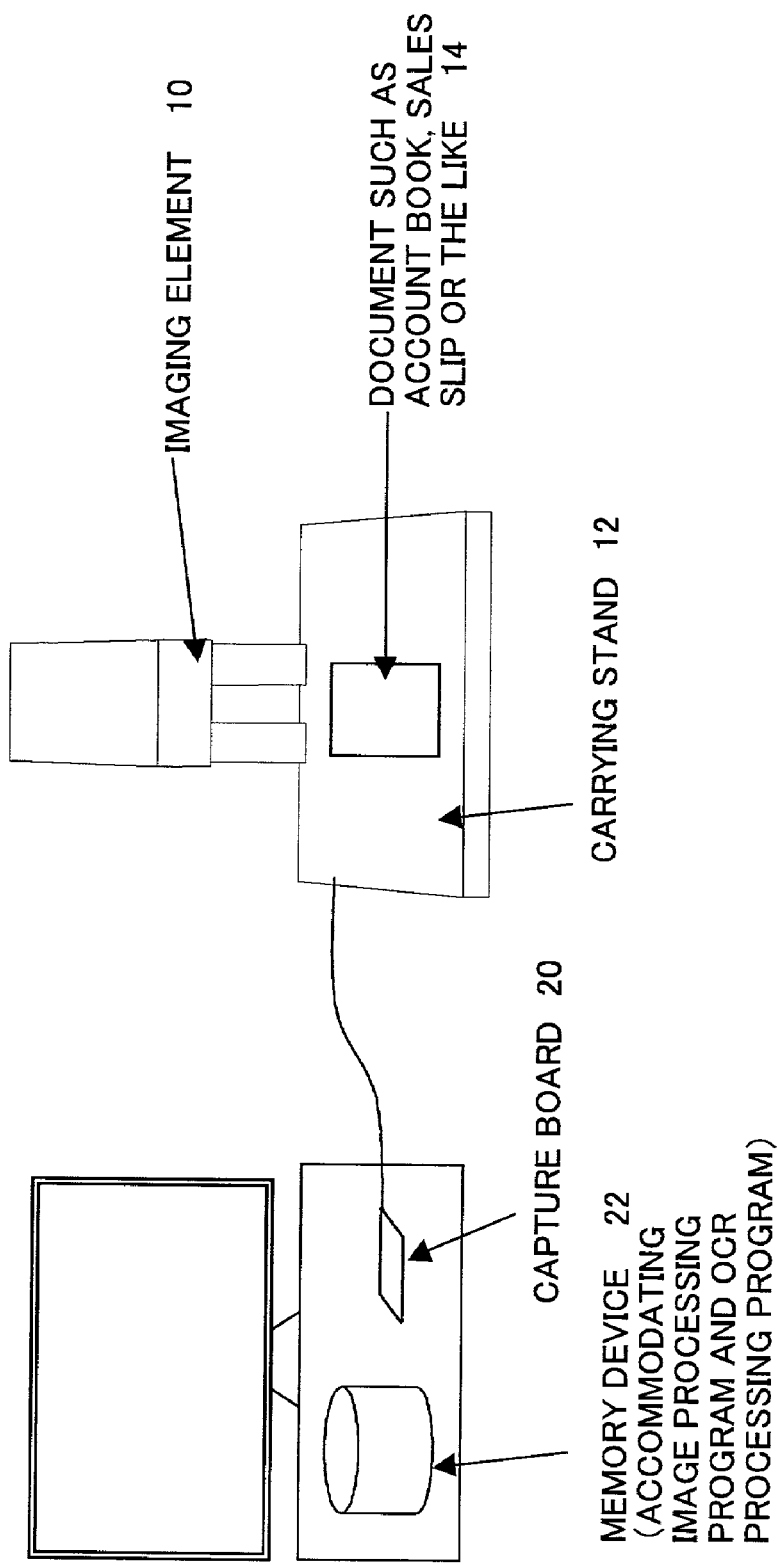
FIG. 1 shows an example of the schematic method construction that is used to perform the image processing method in an embodiment of the present invention.

FIG. 1 is a diagram which shows an example of the schematic system construction that is used to perform the image processing method in an embodiment of the present invention. In FIG. 1, the imaging device 1 uses an imaging element 10 to image a document 14 such as an account book, sales slip or the like placed on a carrying stand 12, and outputs an image signal to a computer device 2. The imaging device 1 performs imaging a plurality of times while shifting the imaging element 10 during the imaging period according to the "pixel shift method", and outputs the partial image data obtained by the respective imaging operations to the computer device 2. For example, the computer device 2 is a general-purpose personal computer; this computer inputs data for a plurality of partial images by means of a mounted capture board 20, and assembles an overall image from this data. The computer device 2 performs OCR processing (character recognition processing) on the overall image data using an OCR program which is installed in a memory device (for example, a hard disk drive) 22 or the like.

In such a system, the image processing method of the present embodiment is performed by an image processing program which is installed in the computer device 2; prior to performing OCR processing, the computer device 2 executes the image processing program of the present embodiment, and detects whether or not any moving object is contained in the overall image data.

FIGS. 2A, 2B, 2C and 2D are diagrams illustrating the image processing method in an embodiment of the present invention. In the present embodiment, the overall image (FIG. 2A shows the actual image; FIG. 2B shows a model diagram of the same) that is obtained by imaging performed a plurality of times (e. g., nine times) is separated into partial images P1 through P9 for each imaging operation (FIG. 2C shows the actual images; FIG. 2D shows a model diagram of the same). Each partial image has a respectively different imaging timing; however, the respective partial images that image only static objects (documents such as account books, sales slips or the like) show more or less the same image. On the other hand, in cases where a moving object (for example, the user's hand) enters the imaging region during the imaging period, the respective partial images become different images as a result of the time difference in the imaging timing of the respective partial images. For example, this refers to cases in which certain partial images show a moving object, while other partial images do not show this moving object due to subsequent movement of the moving object. Furthermore, this also refers to cases in which the region in which the moving object appears is different in each image because of movement of the moving object. Accordingly, by comparing the respective partial images and judging the differences between these partial images, it is possible to detect whether or not a moving object has been imaged. A concrete example of the image processing method used to detect the imaging of a moving object will be described below.

FIGS. 3A and 3B are diagrams illustrating a first image processing method in an embodiment of the present invention. In this first image processing method, the presence or absence of a moving object is judged on the basis of the coordinate positions of the objects of imaging detected by object-of-imaging detection processing that is performed for each partial image. This object-of-imaging detection processing is processing that cuts out the object-of-imaging portions from the imaging regions, and is known processing that finds the object-of-imaging portions by detecting gradation differences between the black color of the background and the white color of the documents such as account books, sales slips or the like that constitute static objects.

FIG. 3A shows an example of a partial image in which only a static object is present, while FIG. 3B shows an example of a partial image which contains a moving object in addition to a static object. As is shown in FIG. 3A, when object-of-imaging detection processing is performed on a partial image in which only a static object is present, the coordinates of the respective edges (upper, lower, left and right) of the document such as an account book, sales slip or the like that constitutes the static object within the imaging region are detected. On the other hand, in cases where a moving object is contained in the image as shown in FIG. 3B, a position that differs from the edge of the static object is detected as an edge. In FIG. 3B, since a hand constituting a moving object is imaged outside the left edge of the static object, a point located even further to the left than the left edge of the static object (i.e., a point located almost at the left edge of the imaging region) is detected as the left edge of the object of imaging. The reason for this is that the hand constituting a moving object generally differs from the gradation (black) of the background, so that the edge of this moving object is recognized as the edge of the static object.

Thus, since the coordinate positions that are detected differ between a partial image in which a moving object is imaged and an image in which no moving object is imaged, a judgement as to whether or not a moving object has been imaged can be made by comparing the respective edge coordinate positions (upper, lower, left and right). Alternatively, it is also possible to determine the area of the object of imaging from the respective edge coordinate positions, and to compare these area values. In concrete terms, the area can be determined from the Y coordinates of the upper and lower edge coordinates and the X coordinates of the left and right edge coordinates.

Figure 4:
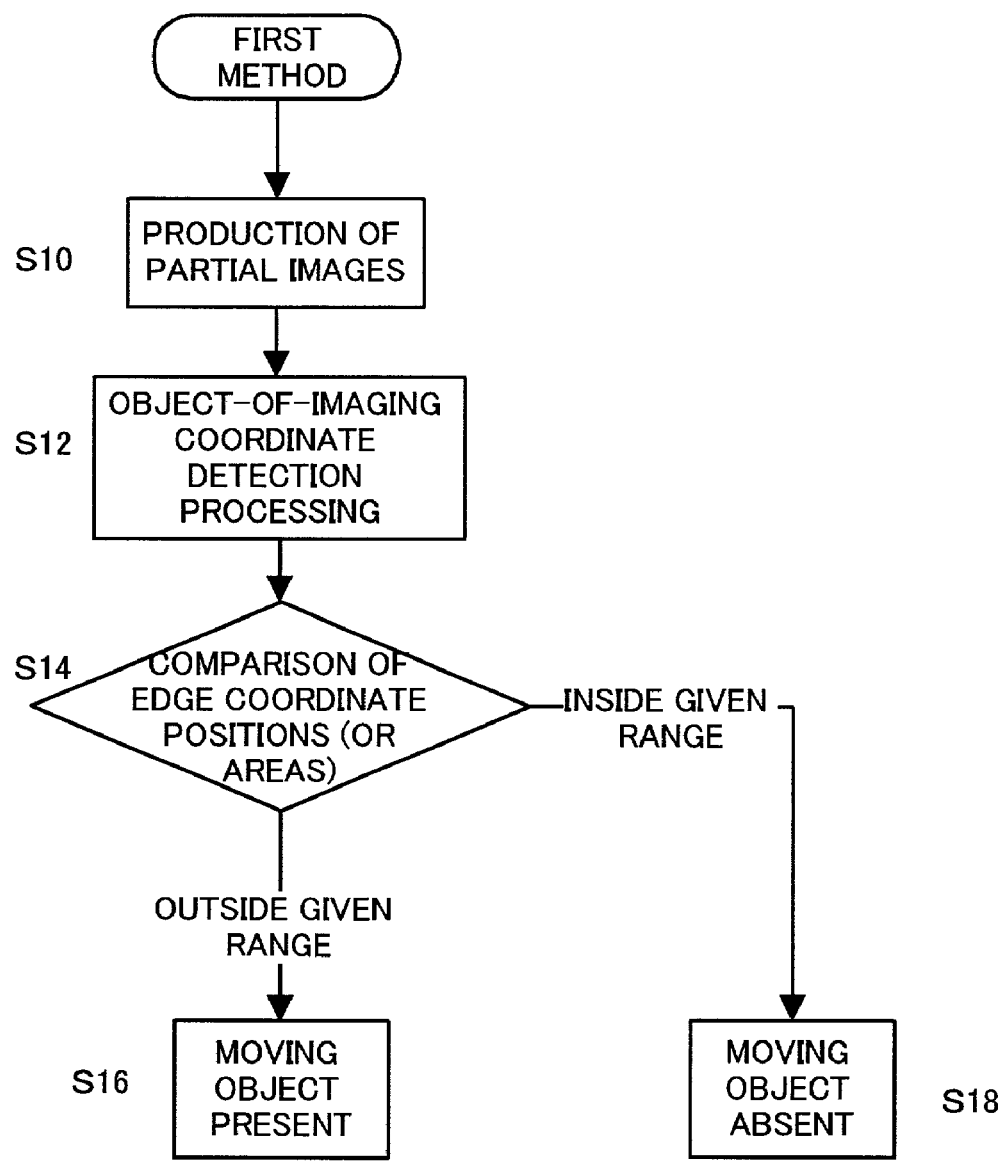
FIG. 4 is a flow chart of a third image processing method in an embodiment of the present invention.

FIG. 4 is a flow chart of a first image processing method in an embodiment of the present invention. The overall image is separated so that a plurality of partial images are produced (S10). Object-of-imaging coordinate detection processing is then performed on the respective partial images (S12). Then, using one of the plurality of partial images as a reference image, the edge coordinate positions (or area) detected in the reference image and the edge coordinate positions (or area) detected in the other partial images are compared (S14). For example, if the partial image P1 is used as the reference image, the partial image P1 and the other partial images P2 through P9 are compared, and if the difference in the edge coordinate positions (or areas) exceeds a given range in at least one of the comparisons, it is judged that a moving object has been imaged (S16). In cases where the difference is within this given range in all of the comparisons, it is judged that no moving object has been imaged (i.e., that only static objects have been imaged) (S18).

FIGS. 5A, 5B, 5C and 5D are diagrams illustrating a second image processing method in an embodiment of the present invention. In this second image processing method, the presence or absence of a moving object is judged on the basis of the optical density gradation distributions (histograms) in the respective partial images. The optical density gradation is the optical density (light and dark) distribution of the respective pixels that form the image; for example, this distribution is split into 8-bit (256) gradations.

FIG. 5A shows an example of a partial image in which only a static object is present, and FIG. 5B shows an example of a histogram corresponding to this image. As is shown in FIG. 5B, the histogram corresponding to a partial image in which only a static object is present has two peaks, i.e., a gradation corresponding to the black color of the background, and a gradation corresponding to the white-colored portion of the abovementioned document such as an account book, sales slip or the like.

Meanwhile, FIG. 5C shows an example of a partial image which contains a moving object in addition to a static object, and FIG. 5D shows an example of a histogram corresponding to this image. In this histogram corresponding to a partial image that contains a moving object, as is shown in FIG. 5D, a peak that corresponds to the moving object appears at a separate gradation that differs from the gradations corresponding respectively to the background and document such as an account book, sales slip or the like (static object) (in other words, the distribution quantity indicated by a dotted circle in FIG. 5B moves to the optical density gradation of the moving object, so that a new peak is generated as shown in FIG. 5D).

For example, histogram threshold value setting processing is performed in order to judge the differences between the histograms of the respective partial images. This threshold value setting processing is processing in which one threshold value is determined by binarizing the distributions in the histograms. For example, this threshold value setting processing can be realized by determining a so-called "Ohtsu threshold value". This "Ohtsu threshold value" is described by Nobuyuki Ohtsu in "Method for automatic threshold value selection based on discrimination and least squares criteria" [Hanbetsu oyobi saisho 2-jo kijun ni motozuku jido shikii-chi senteiho], *Denshi Joho Tsushin Gakkai Ronbun-shi*, J63-D, Vol. 4, pp. 349-356 (1980).

If the threshold value determined by threshold value setting processing for the histogram shown in FIG. 5B (image containing only a static object) is designated as value A, then, since the histogram shown in FIG. 5D (image containing a static object and a moving object) has a peak at a gradation relatively close to black that corresponds to the moving object, the threshold value of the histogram shown in FIG. 5D is the value B at a position that is shifted more toward the black side than the abovementioned value A.

Thus, since the determined threshold values are different in partial images in which a moving object is imaged and images in which a moving object is not imaged, a judgement as to whether or not a moving object has been imaged can be made by comparing the threshold values of the respective partial images.

Figure 6:
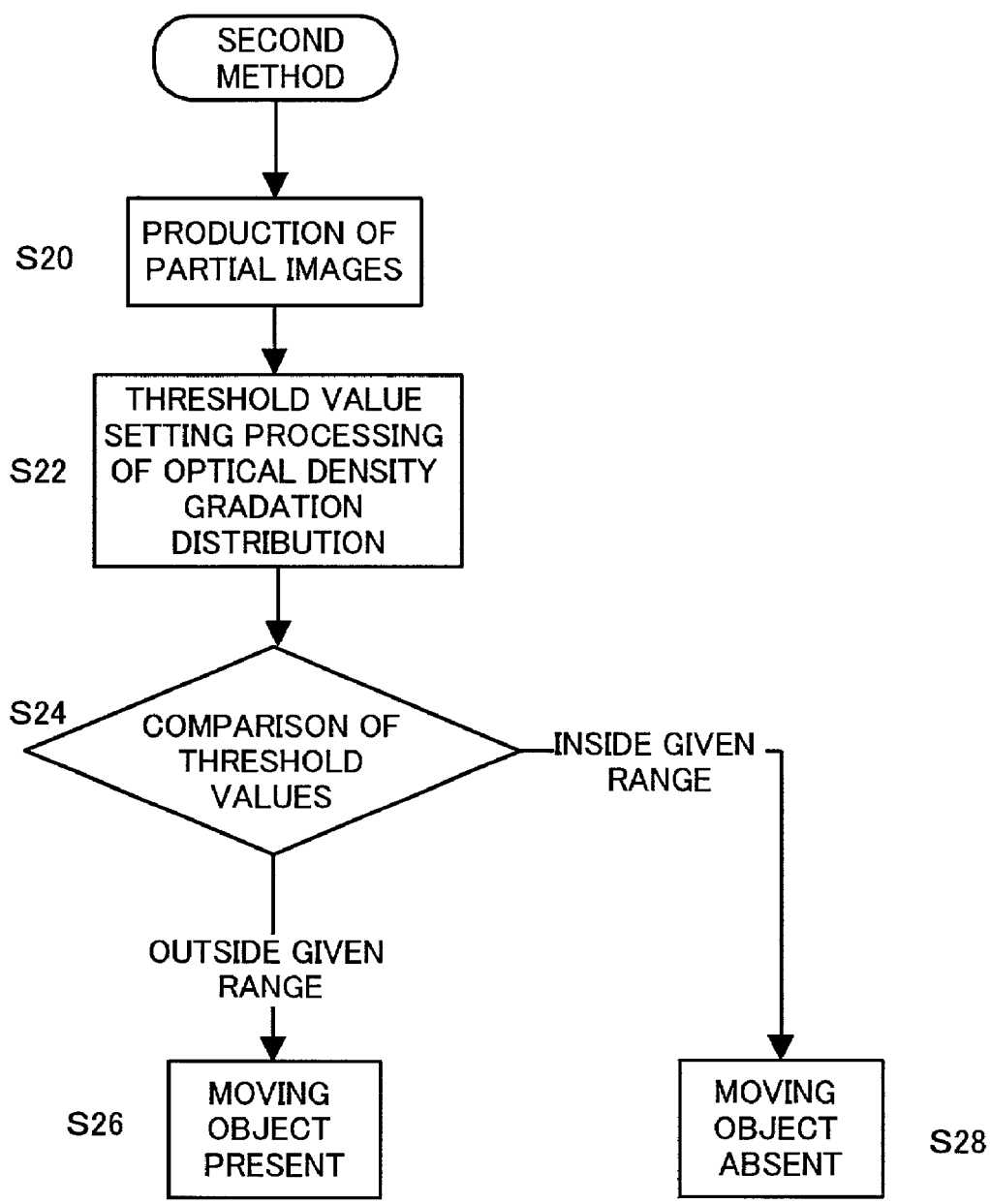
FIG. 6 is a flow chart of a second image processing method in an embodiment of the present invention.

FIG. 6 is a flow chart of the abovementioned second image processing method in an embodiment of the present invention. The overall image is separated so that a plurality of partial images are produced (S20). Threshold value setting processing is performed for the respective partial images (S22). Then, using one of the plurality of partial images as a reference image, the threshold value determined for this reference image and the threshold values determined for the other partial images are compared (S24). As in the case of the first image processing method, for example, if the partial image P1 is designated as the reference image, this partial image P1 is compared respectively with the other partial images P2 through P9, and if the difference in threshold values exceeds a given range in at least one of the comparisons, it is judged that a moving object has been imaged (S26). If the difference in threshold values is within this given range in all of the comparisons, then it is judged that a moving object has not been imaged (i.e., that only static objects have been imaged) (S28).

FIGS. 7A, 7B and 7C are diagrams illustrating a third image processing method in an embodiment of the present invention. In this third image processing method, the presence or absence of a moving object is judged on the basis of the degree of difference between the respective partial images. The degree of difference between the partial images that are compared can be determined by calculating the exclusive logical sum (exclusive OR) of the pixel values of corresponding pixels, and determining this degree of difference as the ratio of the number of pixels with different pixel values to the number of pixels of the partial images as a whole. Specifically, the degree of difference is the ratio of the different portions to the imaging region.

FIG. 7A shows an example of a partial image in which only a static object is present, and FIG. 7B shows an example of a partial image that contains a moving object in addition to a static object. Furthermore, FIG. 7C shows an example of an image that expresses the degree of difference between these partial images. The differing portions are indicated as black pixels, while the coinciding portions are indicated as white pixels.

In a case where partial images in which only static objects are imaged are compared with each other, the degree of difference is extremely low, e. g., approximately 2% at the most. Since the imaging regions of the partial images are respectively shifted by a slight amount, the degree of difference does not reach zero. On the other hand, in a case where a partial image in which only a static object is imaged and a partial image which also contains a moving object are compared with each other, the pixel values of the portions corresponding to the moving object are different, so that the degree of difference is relatively high. Accordingly, since the degree of difference determined in a comparison of images containing only static objects with each other differs from that determined in a comparison of an image containing only a static object with a partial image that also contains a moving object, a judgement as to whether or not a moving object has been imaged can be made by comparing this degree of difference.

Figure 8:
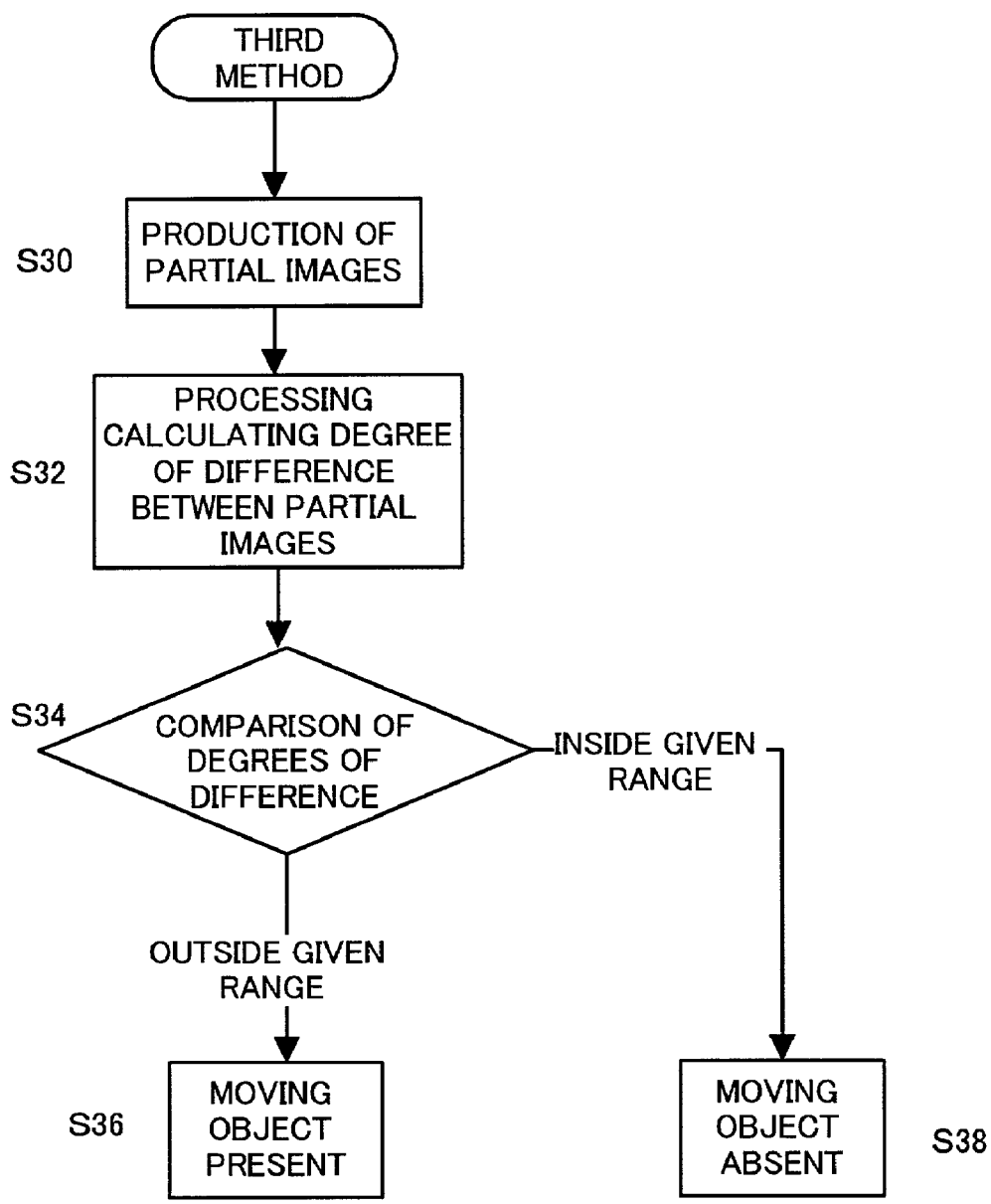
FIG. 8 is a flow chart of a third image processing method in an embodiment of the present invention.
Figure 9:
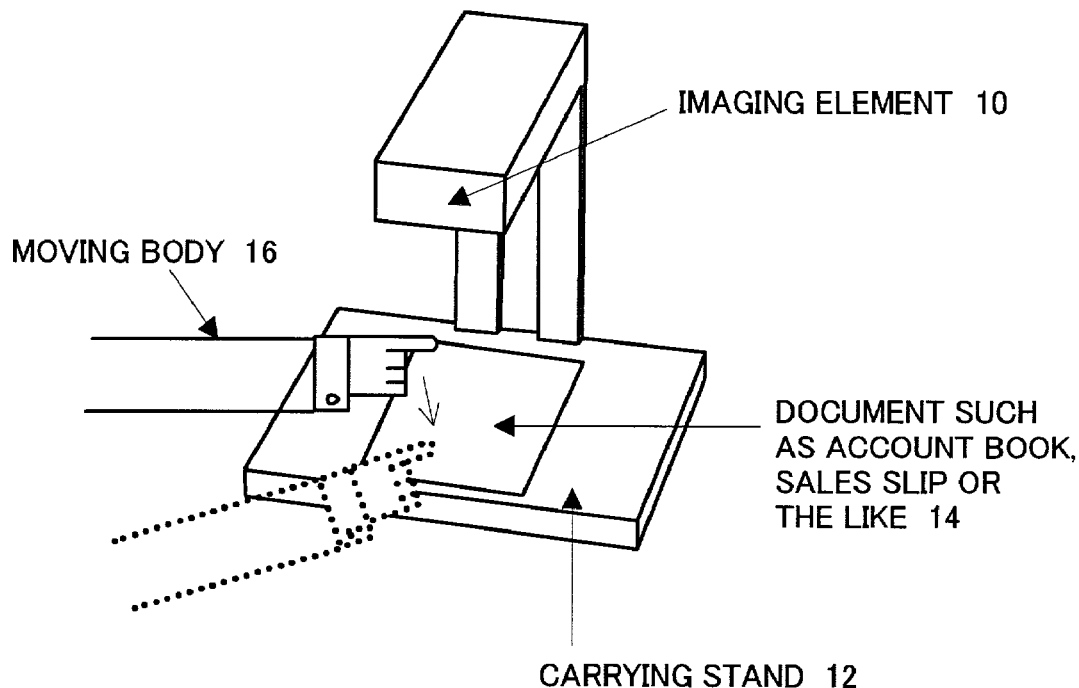
FIG. 9 is a schematic perspective view of an account book/sales slip reading device as an example of an imaging device.
Figure 10:
FIGS. 10A and 10B are diagrams illustrating the pixel shift method.

FIG. 8 is a flow chart of the abovementioned third image processing method in an embodiment of the present invention. The overall image is separated so that a plurality of partial images are produced (S30). Using one of the plurality of partial images as a reference image, the respective degrees of difference between the reference image and the other partial images are calculated (S32). Then, the plurality of degrees of difference thus determined are compared (S34). As in the first image processing method, for example, if the partial image P1 is taken as the reference image, the degrees of difference between the partial image P1 and the other partial images P2 through P9 are respectively calculated, and in cases where the variation in the plurality of degrees of difference thus determined exceeds a given range, it is judged that a moving object has been imaged (S36). In cases where the variation is within this given range, it is judged that a moving object has not be imaged (i.e., that only static objects have been imaged) (S38).

Furthermore, in the abovementioned third image processing method, the degrees of difference were determined for all of the pixels in each partial image. However, the present invention is not limited to a determination for all of the pixels; it would also be possible, for example, to determine the degree of difference for pixels at specified intervals.

Furthermore, in the respective image processing methods described above, an error output may be performed prior to OCR processing in cases where it is judged that a moving object has been imaged. As a result, erroneous recognition or the like in OCR processing can be prevented in advance.

Furthermore, the image processing methods of these embodiments may also be carried out by the imaging device proper rather than by a computer device that is connected to the imaging device. Specifically, in such a case, the imaging device functions as an image processing device. Furthermore, in cases where the image processing methods of these embodiments are carried out by means of a computer device as described above, this computer device constitutes an image processing device. Moreover, an image processing device may also be constructed by means of such a computer device and imaging device.

Thus, the present invention makes it possible to detect whether or not a moving object is contained separately from static objects in images that are acquired by means of an imaging device that successively images a plurality of respectively different imaging regions during the imaging period.

In cases where the acquired images are subjected to OCR processing, accurate character recognition cannot be performed if a moving object is contained in the image being processed; accordingly, the erroneous operation of OCR processing can be prevented in advance by making a judgement beforehand as to whether or not a moving object is contained in the image being processed.

The protected scope of the present invention is not limited to the abovementioned embodiments, but extends to the inventions described in the claims and equivalent entities.

What is claimed is:

1. An image processing method for an image, the method comprising the steps of:

obtaining a plurality of partial images by successively imaging different imaging regions in a plurality of imaging operations during an imaging period by means of an imaging device;

combining the plurality of partial images into an image;

separating said image into the plurality of partial images respectively corresponding to each of the plurality of imaging operations; and judging whether or not a moving object is on said image on the basis of a comparison between a position of an edge of said moving object in at least two of said plurality of partial images.

2. The image processing method according to claim 1, wherein said judging includes detecting at least one edge position of an object portion contained in each of said plurality of partial images on the basis of processing that detects said object portions, and includes comparing said plurality of partial images by utilizing these edge positions.

3. The image processing method according to claim 2, wherein said judging includes a number of edge positions that are necessary in order to determine areas of said object portions, and includes comparing the areas of the respective object portions of said plurality of partial images.

4. The image processing method according to claim 1, wherein said judging includes determining an optical density gradation distribution of each of said plurality of partial images, and includes comparing said plurality of partial images by utilizing the optical density gradation distributions.

5. The image processing method according to claim 4, wherein said judging includes determining threshold values in the respective partial images on the basis of threshold value selling processing for said optical density gradation distribution, and includes comparing said threshold values for said plurality of partial images.

6. The image processing method according to claim 1, wherein said judging includes determining a degree of difference between two partial images among said plurality of partial images for a plurality of combinations of two partial images, and includes comparing said plurality of partial images by utilizing the degrees of difference.

7. The image processing method according to claim 6, wherein said judging includes calculating the degrees of difference on the basis of the exclusive logical sums of the respective pixel values of said two partial images.

8. A computer-readable medium encoded with a computer program to perform an image processing method for an image, said image processing method comprising the steps of:

obtaining a plurality of partial images by successively imaging different imaging regions in a plurality of imaging operations during an imaging period by means of an imaging device;

combining the plurality of partial images into an image;

separating said image into a plurality of partial images respectively corresponding to each of a plurality of imaging operations; and judging whether or not a moving object is on said image on the basis of a comparison between a position of an edge of said moving object in at least two of said plurality of partial images.

9. The computer-readable medium encoded with the computer program according to claim 8,
wherein said judging includes detecting at least one edge position of an object portion contained in each of said plurality of partial images on the basis of processing that detects said object portions, and includes comparing said plurality of partial images by utilizing these edge positions.

10. The computer-readable medium encoded with the computer program according to claim 9,
wherein said judging includes a number of edge positions that are necessary in order to determine areas of said object portions, and includes comparing the areas of the respective object portions of said plurality of partial images.

11. The computer-readable medium encoded with the computer program according to claim 8, wherein said judging includes determining an optical density gradation distribution of each of said plurality of partial images, and includes comparing said plurality of partial images by utilizing the optical density gradation distributions.

12. The computer-readable medium encoded with the computer program according to claim 11, wherein said judging includes determining threshold values in the respective partial images on the basis of threshold value setting processing for said optical density gradation distribution, and includes comparing said threshold values for said plurality of partial images.

13. The computer-readable medium encoded with the computer program according to claim 8, wherein said judging includes determining a degree of difference between two partial images among said plurality of partial images for a plurality of combinations of two partial images, and includes comparing said plurality of partial images by utilizing the degrees of difference.

14. The computer-readable medium encoded with the computer program according to claim 13, wherein said judging includes calculating the degrees of difference on the basis of the exclusive logical sums of the respective pixel values of said two partial images.

15. An image processing device comprising:
an imaging unit for an image generated by combining a plurality of partial images which are obtained by successively imaging different imaging regions a plurality of times during the imaging period;
a separating unit for separating said image into the plurality of partial images respectively corresponding to a plurality of imaging operations; and
a judging unit for judging whether or not a moving object is on said image on the basis of a comparison between a position of an edge of said moving object in at least two of said plurality of partial images.

16. The image processing device according to claim 15, wherein said judging unit detects at least one edge position of an object portion contained in each of said plurality of partial images on the basis of processing that detects said object portions, and compares said plurality of partial images by utilizing the edge positions.

17. The image processing device according to claim 16, wherein said judging unit detects a number of edge positions that are necessary in order to determine the areas of said object portions, and compares the areas of the respective object portions of said plurality of partial images.

18. The image processing device according to claim 15, wherein said judging unit determines an optical density gradation distribution of each of said plurality of partial images, and compares said plurality of partial images by utilizing the optical density gradation distributions.

19. The image processing device according to claim 18, wherein said judging unit determines threshold values in the respective partial images on the basis of threshold value setting processing for said optical density gradation distributions, and compares said threshold values for said plurality of partial images.

20. The image processing device according to claim 15, wherein said judging unit determines a degree of difference between two partial images among said plurality of partial images for a plurality of combinations of two partial images, and compares said plurality of partial images utilizing these degrees of difference.

21. The image processing device according to claim 20, wherein said judging unit calculates a degrees of difference on the basis of the exclusive logical sums of the respective pixel values of said two partial images.

* * * * *

UNITED STATES PATENT AND TRADEMARK OFFICE
CERTIFICATE OF CORRECTION

PATENT NO. : 7,319,776 B2
APPLICATION NO. : 10/101269
DATED : January 15, 2008
INVENTOR(S) : Katsumi Ide et al.

It is certified that error appears in the above-identified patent and that said Letters Patent is hereby corrected as shown below:

Column 8, Line 39, change "selling" to --setting--.

Signed and Sealed this

Twenty-sixth Day of August, 2008

JON W. DUDAS
*Director of the United States Patent and Trademark Office*